United States Patent
Jo (10) Patent No.: US 9,762,819 B2
(45) Date of Patent: Sep. 12, 2017

(54) VOLTAGE GENERATOR AND IMAGE SENSING DEVICE INCLUDING THE SAME

(71) Applicant: SK hynix Inc., Gyeonggi-do (KR)

(72) Inventor: Min-Hee Jo, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 82 days.

(21) Appl. No.: 14/738,482

(22) Filed: Jun. 12, 2015

(65) Prior Publication Data

US 2016/0248996 A1 Aug. 25, 2016

(30) Foreign Application Priority Data

Feb. 24, 2015 (KR) ........................ 10-2015-0025601

(51) Int. Cl.
*H04N 5/335* (2011.01)
*H04N 5/369* (2011.01)
*H04N 5/232* (2006.01)
*H04N 5/374* (2011.01)

(52) U.S. Cl.
CPC ........... *H04N 5/335* (2013.01); *H04N 5/3698* (2013.01); *H04N 5/374* (2013.01)

(58) Field of Classification Search
CPC ...... H04N 5/335; H04N 5/3698; H04N 5/374; H04N 5/232; H04N 5/23241; G06F 1/3203

USPC ................................................... 348/294, 372
See application file for complete search history.

(56) References Cited

U.S. PATENT DOCUMENTS

| | | | | |
|---|---|---|---|---|
| 9,201,441 B2* | 12/2015 | Ingino | ........................ | G05F 3/08 |
| 2002/0089594 A1* | 7/2002 | Ishimoto | ................ | H04N 5/232 |
| | | | | 348/296 |
| 2008/0067998 A1* | 3/2008 | Lee | ........................ | G06F 1/3203 |
| | | | | 323/354 |
| 2009/0251188 A1* | 10/2009 | Kim | ....................... | H02M 3/073 |
| | | | | 327/291 |
| 2014/0139728 A1* | 5/2014 | Kim | ................... | H04N 5/23241 |
| | | | | 348/372 |

FOREIGN PATENT DOCUMENTS

KR 1020140079284 6/2014

\* cited by examiner

*Primary Examiner* — Nhan T Tran
(74) *Attorney, Agent, or Firm* — IP & T Group LLP (57) ABSTRACT

A voltage generator includes a supply voltage conversion block suitable for converting a supply voltage into an internal voltage, and a supply voltage control block suitable for supplying the supply voltage to the supply voltage conversion block, wherein the supply voltage has different voltage levels that correspond to generation sections of the internal voltage.

13 Claims, 6 Drawing Sheets

VOLTAGE GENERATOR AND IMAGE SENSING DEVICE INCLUDING THE SAME

CROSS-REFERENCE TO RELATED APPLICATIONS

The present application claims priority of Korean Patent Application No. 10-2015-0025601, filed on Feb. 24, 2015, which is incorporated herein by reference in its entirety.

BACKGROUND

1. Field

Exemplary embodiments of the present invention relate to a semiconductor design technology and, more particularly, to a voltage generator and an image sensing device including the same.

2. Description of the Related Art

Semiconductor device operations require the use of various different voltages. However, since all the voltages that are used internally are not supplied from an external device, the semiconductor device has voltage generators for generating different internal voltages. The semiconductor device may include a voltage generator for boosting a power supply voltage VDD that is supplied from an external device to generate a boosted voltage VPP having a voltage that is higher than the power supply voltage VDD. The voltage generator includes a DC/DC converter.

One example of semiconductor devices that have a voltage generator are image sensing devices. Image sensing devices use the boosted voltage VPP in lieu of the power supply voltage VDD to improve operational reliability. For example, the image sensing device generates an operation control signal, which is used to transmit a photo-electric charge accumulated in a photodiode to a floating diffusion node, based on the boosted voltage VPP. As the transmission capability is improved when the photo-electric charge is transmitted to the floating diffusion node, the operational reliability of the image sensing device may be also improved.

An image sensing device captures images using the photosensitive properties of semiconductors. The image sensing device may be classified into charge coupled device (CCD) image sensors and complementary metal oxide semiconductor (CMOS) image sensors. The CMOS image sensors have come into widespread use. This is because CMOS image sensors allow for analog circuits and digital control circuits to be directly implemented on a single integrated circuit (IC).

SUMMARY

Exemplary embodiments of the present invention are directed to a voltage generator that may generate an internal voltage having reduced ripples, and an image sensing device including the voltage generator.

Also, exemplary embodiments of the present invention are directed to a voltage generator that may generate an internal voltage having reduced ripples and may also reduce the initial section (i.e. the initial timing section) for generating the internal voltage, and an image sensing device including the voltage generator.

In accordance with an embodiment of the present invention, a voltage generator may include a supply voltage conversion block suitable for converting a supply voltage into an internal voltage, and a supply voltage control block suitable for supplying the supply voltage has different voltage levels that correspond to generation sections (i.e. sections of time or periods) of the internal voltage to the supply voltage conversion block.

The generation sections of the internal voltage may include a start-up section (i.e. a startup period) where the internal voltage is developed to a target level and a normal section (i.e. a normal period) after the internal voltage reaches the target level.

The supply voltage may have a first voltage level during the start-up section and have a second voltage level lower than the first voltage level during the normal section.

In accordance with another embodiment of the present invention, a voltage generator may include a supply voltage conversion part suitable for generating a boosted voltage by boosting a supply voltage based on first and second clocks, a voltage detection part suitable for detecting a voltage level of the boosted voltage, and a voltage supply part suitable for supplying the supply voltage to the supply voltage conversion part in response to a detection signal outputted from the voltage detection part, wherein the supply voltage may have a first voltage level during a start-up section where the boosted voltage is developed to a target level and have a second voltage level lower than the first voltage level during a normal section after the boosted voltage reaches the target level.

The voltage detection part may include a division block suitable for dividing the boosted voltage at a predetermined division ratio and generating a divided voltage, and a first comparison block suitable for comparing the divided voltage with a target voltage and generating the detection signal.

The voltage supply part may include a reference voltage generation block suitable for generating one among a power supply voltage and a reduced voltage having a voltage level lower than that of the power supply voltage as a reference voltage in response to the detection signal and a supply voltage generation block suitable for generating the supply voltage based on the reference voltage.

The reference voltage generation block may include a reduction unit suitable for reducing the power supply voltage and generating the reduced voltage, and a selection unit suitable for outputting the power supply voltage or the reduced voltage as the reference voltage in response to the detection signal.

The supply voltage generation block may include a second comparison unit suitable for comparing the reference voltage with the supply voltage, and a driving unit suitable for driving an output terminal of the supply voltage with the power supply voltage in response to a comparison signal outputted from the second comparison unit.

In accordance with another embodiment of the present invention, an image sensing device may include a pixel suitable for generating an image signal in response to a plurality of operation control signals, an operation controller suitable for generating one or more of the operation control signals based on an internal voltage, and a voltage generator suitable for generating the internal voltage based on a supply voltage having different voltage levels that correspond to generation sections of the internal voltage.

The pixel may include a transistor suitable for electrically coupling a photodiode to a floating diffusion node in response to a first operation control signal among the operation control signals, wherein the operation controller may generate the first operation control signal based on the internal voltage.

The generation sections of the internal voltage may include a start-up section where the internal voltage is developed to a target level and a normal section after the internal voltage reaches the target level.

The voltage generator may generate the internal voltage based on the supply voltage having a first voltage level during the start-up section and having a second voltage level lower than the first voltage level during the normal section.

The voltage generator may include a supply voltage conversion part suitable for converting the supply voltage into the internal voltage, and a supply voltage control part suitable for supplying the supply voltage to the supply voltage conversion part, wherein the supply voltage may have different voltage levels that correspond to the generation sections of the internal voltage.

The supply voltage conversion part may boost the supply voltage based on first and second clocks and generate a boosted voltage as the internal voltage.

The supply voltage control part may include a voltage detection block suitable for detecting a voltage level of the boosted voltage, and a voltage supply block suitable for supplying the supply voltage to the supply voltage conversion part in response to a detection signal outputted from the voltage detection block, wherein the supply voltage has a first voltage level during a start-up section where the boosted voltage is developed to a target level and has a second voltage level lower than the first voltage level during a normal section after the boosted voltage reaches the target level.

The voltage detection block may include a division unit suitable for dividing the boosted voltage at a predetermined division ratio and generating a divided voltage, and a first comparison unit suitable for comparing the divided voltage with a target voltage and generating the detection signal.

The voltage supply block may include a reference voltage generation block suitable for generating a power supply voltage or a reduced voltage having a voltage level lower than that of the power supply voltage as a reference voltage in response to the detection signal, and a supply voltage generation block suitable for generating the supply voltage based on the reference voltage.

The reference voltage generation block may include a reduction unit suitable for reducing the power supply voltage and generating the reduced voltage, and a selection unit suitable for outputting the power supply voltage or the reduced voltage as the reference voltage in response to the detection signal.

The supply voltage generation block may include a second comparison unit suitable for comparing the reference voltage with the supply voltage, and a driving unit suitable for driving an output terminal of the supply voltage with the power supply voltage in response to a comparison signal output from the second comparison unit.

DETAILED DESCRIPTION

Exemplary embodiments of the present invention are described below in more detail with reference to the accompanying drawings. These embodiments are provided so that this disclosure is thorough and complete, and fully conveys the scope of the present invention to those skilled in the art. All "embodiments" referred to in this disclosure refer to embodiments of the inventive concept disclosed herein. The embodiments presented are merely examples and are not intended to limit the inventive concept.

It is also noted that in this specification, "connected/coupled" refers to one component not only directly coupling another component but also indirectly coupling another component through an intermediate component. In addition, a singular form may include a plural form as long as it is not specifically mentioned.

Figure 1:
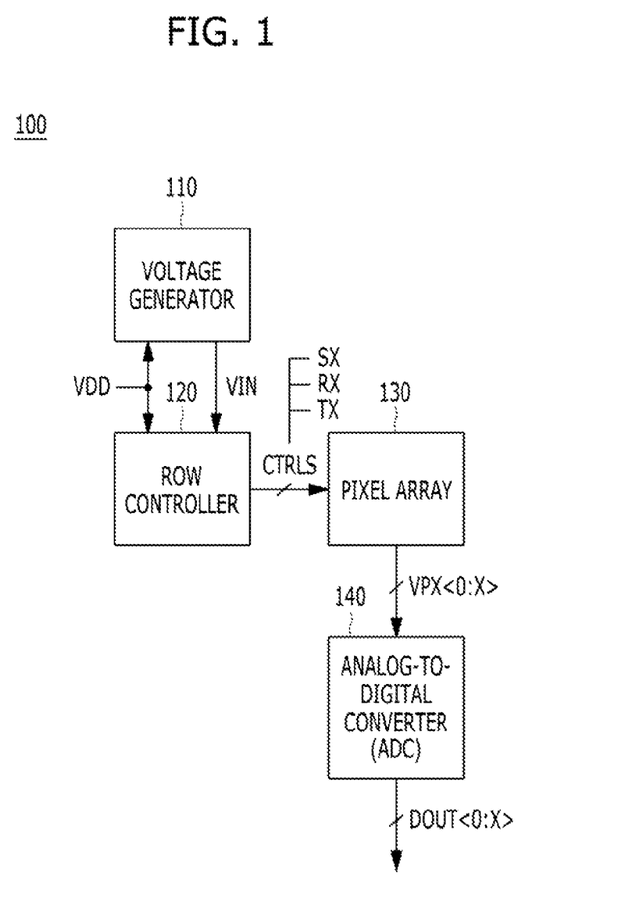
FIG. 1 is a block diagram illustrating an image sensing device in accordance with an embodiment of the present invention.
Figure 2:
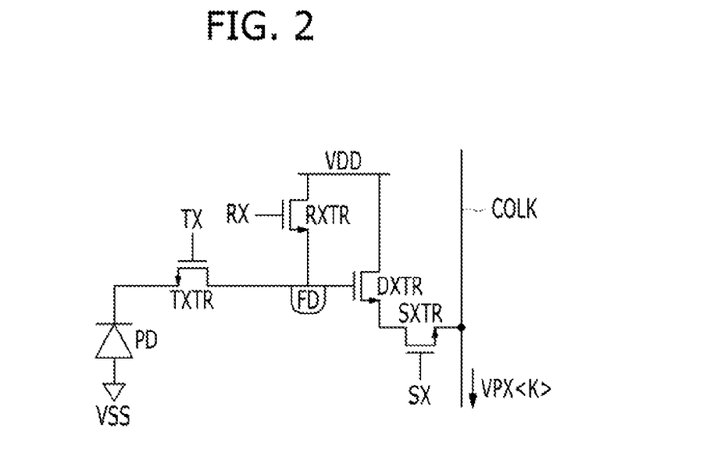
FIG. 2 is a circuit diagram illustrating a pixel included in a pixel array shown in FIG. 1.

FIG. 1 is a block diagram illustrating an image sensing device in accordance with an embodiment of the present invention. FIG. 2 is a circuit diagram illustrating a pixel included in a pixel array 130 shown in FIG. 1.

Referring to FIG. 1, the image sensing device 100 may include a voltage generator 110, a row controller 120, a pixel array 130, and an analog-to-digital converter (ADC) 140.

The voltage generator 110 may generate an internal voltage VIN based on a supply voltage VOUT having different voltage levels that correspond to generation sections of the internal voltage VIN and a source voltage VDD having a fixed voltage level regardless of the generation sections of the internal voltage VIN. For example, the voltage generator 110 may generate the internal voltage VIN having voltage level higher than that of the source voltage VDD. The voltage generator 110 is described below in detail. 120 may generate a plurality of operation control signals CTRLS based on the source voltage VDD and the internal voltage VIN. For example, the operation control signals CTRLS may include a transmission signal TX, a reset signal RX, a selection signal SX, etc. for controlling an operation of the pixel array 130. Although the operation control signals CTRLS actually include a plurality of transmission signals TX<0:N>, a plurality of reset signals RX<0:N>, and a plurality of selection signals SX<0:N> for controlling the pixel array 130 by rows, it is described herein that a single transmission signal TX, a single reset signal RX and a single selection signal SX are included in the operation control signals CTRLs, for a simplified description. The row controller 120 may generate the reset signal RX and the selection signal SX among the operation control signals CTRLS based on the source voltage VDD and the transmission signal TX among the operation control signals CTRLS based on the internal voltage VIN.

The pixel array 130 may include a plurality of pixels (not shown in the drawing) arranged in a row and a column direction. The pixel's may generate a plurality of pixel signals VPX<0:X> by rows in response to the operation control signals CTRLS. One among the pixel's is representatively described as follows. For example, referring to FIG. 2, the pixel may have a 4-transistor structure. The pixel may include a photodiode PD, a reset transistor RXTR, a transmission transistor TXTR, a driving transistor DXTR, and a selection transistor SXTR. The photodiode PD may generate a photo-electric charge in response to incident light. The reset transistor RXTR may drive a floating diffusion node FD with a predetermined voltage, e.g., VDD, in response to the reset signal RX. The transmission transistor TXTR may transmit the photo-electric charge generated from the photodiode PD to the floating diffusion node FD in response to the transmission signal TX. The driving transistor DXTR may drive a corresponding column line COLK in response to a voltage of the floating diffusion node FD. The selection transistor SXTR may couple the driving transistor DXTR to the corresponding column line COLK. The transmission signal TX may be generated based on the internal voltage VIN having a voltage level higher than that of the source voltage VDD as described above. Therefore, since the transmission transistor TXTR is under the control of the transmission signal TX, the transmission capability of the transmission transistor TXTR may be improved.

Referring back to FIG. 1, the analog-to-digital converter 140 may convert the pixel signals VPX<0:X> into a plurality of digital signals DOUT<0:X>.

Figure 3:
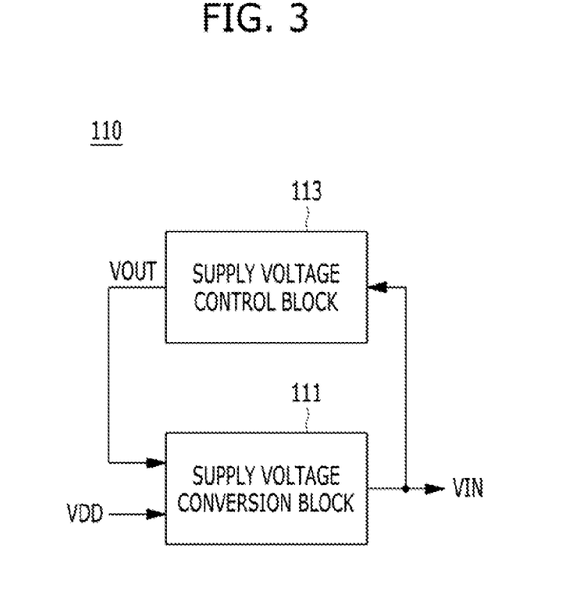
FIG. 3 is a block diagram illustrating a voltage generator shown in FIG. 1.

FIG. 3 is a block diagramming the voltage generator 110 shown in FIG. 1.

Referring to FIG. 3, the voltage generator 110 may include a supply voltage conversion block 111 and a supply voltage control block 113.

The supply voltage conversion block 111 may convert the supply voltage VOUT into the internal voltage VIN in response to first differential clocks PH1 and /PH1 and second differential clocks PH2 and /PH2. For example, the supply voltage conversion block 111 may boost the supply voltage VOUT in response to the first differential clocks PH1 and /PH1 and the second differential clocks PH2 and /PH2 and generate a boosted voltage VIN) having a voltage level higher than that of the source voltage VDD. The supply voltage control block 113 may supply the supply voltage VOUT having different voltage levels that correspond to generation sections of the internal voltage VIN to the supply voltage conversion block 111.

For example, the generation sections may include a start-up section and a normal section. The start-up section may include an initial generation section where the internal voltage VIN is developed from an initial setting level to a target level. The normal section may include a stabilization section after the internal voltage VIN reaches the target level. The supply voltage VOUT may correspond to the source voltage VDD during the start-up section and then correspond to a reduced voltage VDD-α during the normal section.

Figure 4:
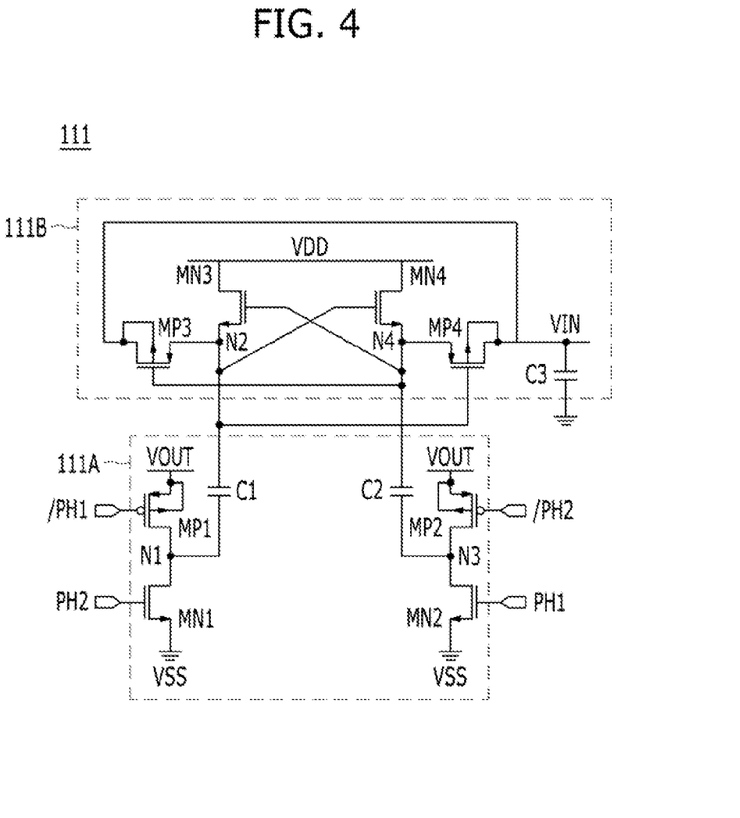
FIG. 4 is a circuit diagram illustrating a supply voltage conversion block shown in FIG. 3.

FIG. 4 is a circuit diagram illustrating the supply voltage conversion block 111 shown in FIG. 3.

Referring to FIG. 4, the supply voltage conversion block 111 may include a DC/DC converter. For example, the supply voltage conversion block 111 may include a boosting unit 111A and an internal voltage maintaining unit 111B.

The boosting unit 111A may continuously boost the supply voltage VOUT in response to the first differential clocks PH1 and /PH1 and the second differential docks PH2 and /PH2. For example, the boosting unit 111A may include a first PMOS transistor MP1, a first NMOS transistor MN1, a first boosting capacitor C1, a second PMOS transistor MP2, a second NMOS transistor MN2, and a second boosting capacitor C2. The first PMOS transistor MP1 has a gate coupled to an input terminal where the first secondary clock /PH1 among the first differential clocks PH1 and /PH1 is inputted, and a source and a drain coupled between a supply voltage VOUT terminal and a first node N1. The first NMOS transistor MN1 has a gate coupled to an input terminal where the second primary clock PH2 among the second differential clocks PH2 and /PH2 is inputted, and a source and a drain coupled between a ground voltage VSS terminal and the first node N1. The first boosting capacitor C1 is coupled between the first node N1 and a second node N2. The second PMOS transistor MP2 has a gate coupled to an input terminal where the second secondary clock /PH2 among the second differential clocks PH2 and /PH2 is inputted, and a source and a drain coupled between the supply voltage VOUT terminal and a third node N3. The second NMOS transistor MN2 has a gate coupled to an input terminal where the first primary clock PH1 among the first differential clocks PH1 and /PH1 is inputted, a source and a drain coupled between the ground voltage VSS terminal and the third node N3. The second boosting capacitor C2 is coupled between the third node N3 and a fourth node N4.

The internal voltage maintaining unit 111B may include a third PMOS transistor MP3, a fourth PMOS transistor MP4, a third NMOS transistor MN3, a fourth NMOS transistor MN4, and a load capacitor C3. The third PMOS transistor MP3 has a gate coupled to the fourth node N4, and a source and a drain coupled between the second node N2 and an internal voltage VIN terminal. The fourth PMOS transistor MP4 has a gate coupled to the second node N2, and a source and a drain coupled between the fourth node N4 and the internal voltage VIN terminal. The third NMOS transistor MN3 has a gate coupled to the fourth node N4, and a source and a drain coupled between a source voltage VDD terminal and the second node N2. The fourth NMOS transistor MN4 has a gate coupled to the second node N2, and a source and a drain coupled between the source voltage VDD terminal and the fourth node N4. The load capacitor C3 is coupled between the internal voltage VIN terminal and the ground voltage VSS terminal.

Although not illustrated in the drawing, the supply voltage conversion block 111 may further include a precharge unit for precharging the internal voltage VIN terminal with a predetermined voltage, e.g., VDD, during a section where the voltage generator 110 is disabled.

Figure 5:
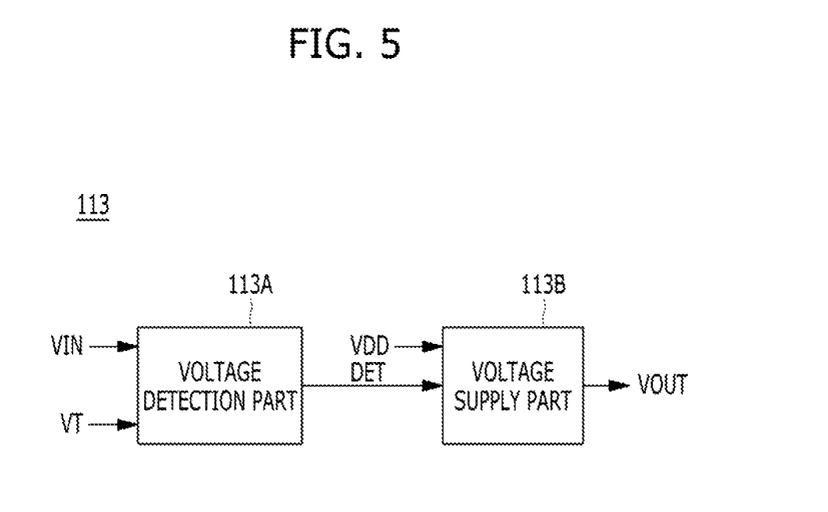
FIG. 5 is a block diagram illustrating a supply voltage control block shown in FIG. 3.

FIG. 5 is a block diagram illustrating the supply voltage control block 113 shown in FIG. 3.

Referring to FIG. 5, the supply voltage control block 113 may include a voltage detection part 113A and a voltage supply part 113B.

The voltage detection part 113A may detect a voltage level of the internal voltage VIN. For example, the voltage detection part 113A may detect the voltage level of the internal voltage VIN based on a preset target voltage VT.

The voltage supply part 113S may supply the supply voltage VOUT which corresponds to the source voltage VDD during the start-up section and then the reduced voltage VDD-α during the normal section, to the supply voltage conversion block 111 in response to a detection signal DET outputted from the voltage detection part 113A.

Figure 6:
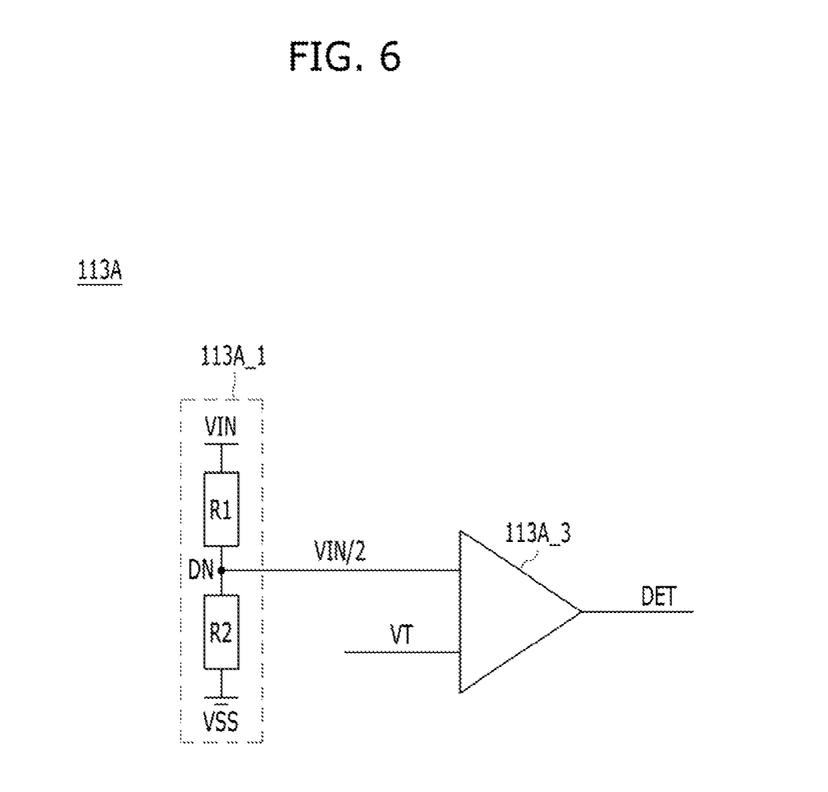
FIG. 6 is a circuit diagram illustrating a voltage detection part shown in FIG. 5.

FIG. 6 is a circuit diagram illustrating the voltage detection part 113A shown in FIG. 5.

Referring to FIG. 6, the voltage detection part 113A may include a division unit 113A_1 and a first comparison unit 113A_3.

The division unit 113A_1 may divide the internal voltage VIN at a predetermined division ratio and generate a divided voltage VIN/2. For example, the division unit 113A_1 may include a first resistor R1 coupled between the internal voltage VIN terminal and a division node DN, and a second resistor R2 coupled between the division node DN and the ground voltage VSS terminal. The first resistor R1 and the second resistor R2 may be designed to have the same resistance value.

The first comparison unit 113A_3 may compare the divided voltage VIN/2 with the target voltage VT and generate the detection signal DET corresponding to the comparison result. For example, the first comparison unit 113A_3 may disable the detection signal DET when the divided voltage VIN/2 is lower than the target voltage VT as the comparison result of the divided voltage VIN/2 and the target voltage VT. In contrast, the first comparison unit 113A_3 may enable the detection signal DET when the divided voltage VIN/2 is higher than the target voltage VT as the comparison result of the divided voltage VIN/2 and the target voltage VT.

Figure 7:
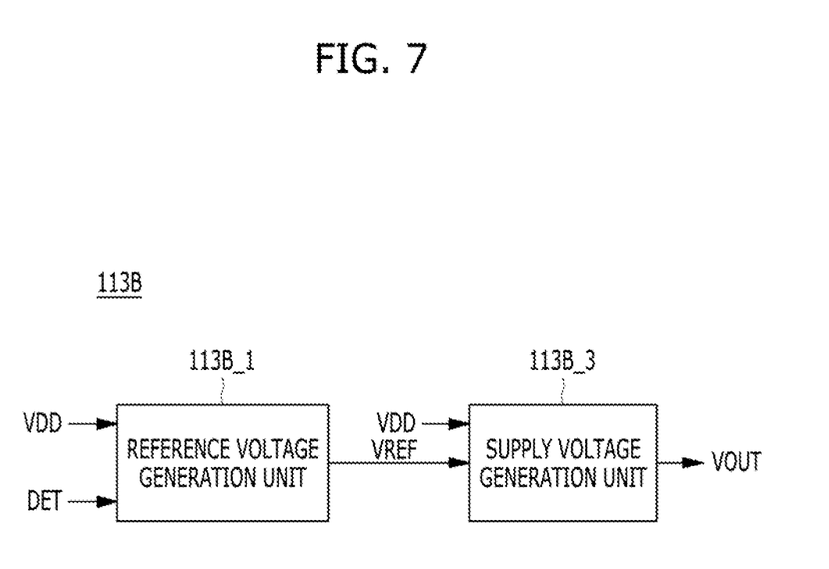
FIG. 7 is a block diagram illustrating a voltage supply part shown in FIG. 5.

FIG. 7 is a block diagram illustrating the voltage supply part 113B shown in FIG. 5.

Referring to FIG. 7, the voltage supply part 113B may include a reference voltage generation unit 113B_1 and a supply voltage generation unit 113B_3.

The reference voltage generation unit 113B_1 may generate a reference voltage VREF corresponding to one among the source voltage VDD and the reduced voltage VDD-α in response to the detection signal DET. For example, the reference voltage generation unit 113B_1 may generate the reference voltage VREF corresponding to the source voltage VDD when the detection signal DET is disabled. In contrast, the reference voltage generation unit 113B_1 may generate the reference voltage VREF corresponding to the reduced voltage VDD-α when the detection signal DET is enabled.

The supply voltage generation unit 113B_3 may generate the supply voltage VOUT based on the reference voltage VREF. For example, the supply voltage generation unit 113B_3 may generate the supply voltage VOUT based on the reference voltage VREF corresponding to the source voltage VDD during the start-up section. The supply voltage generation unit 113B_3 may generate the supply voltage VOUT based on the reference voltage VREF corresponding to the reduced voltage VDD-α during the normal section.

Figure 8:
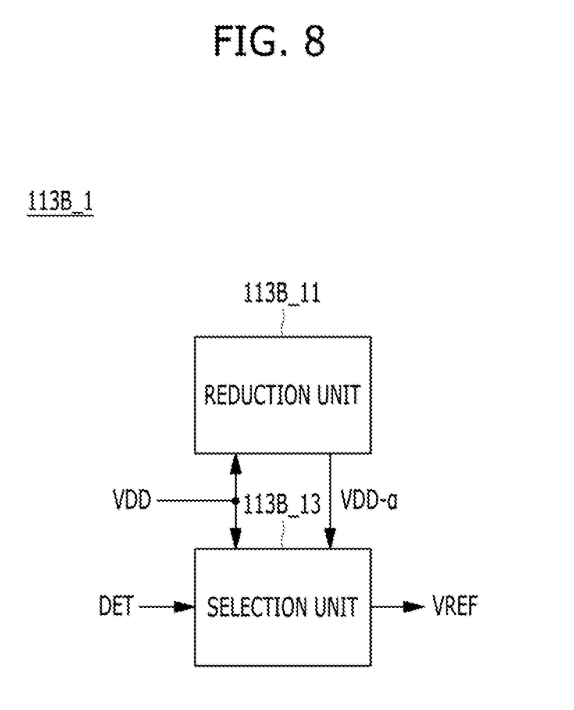
FIG. 8 is a block diagram illustrating a reference voltage generation unit shown in FIG. 7.

FIG. 8 is a block diagram illustrating the reference voltage generation unit 113B_1 shown in FIG. 7.

Referring to FIG. 8, the reference voltage generation unit 113B_1 may include a reduction unit 113B_11 and a selection unit 113B_13.

The reduction unit 113B_11 may reduce the source voltage VDD and generate the reduced voltage VDD-α. For example, the reduction unit 113B_11 may include a voltage divider.

The selection unit 113B_13 may select one among the source voltage VDD and the reduced voltage VDD-α in response to the detection signal DET and supply the selected voltage to the supply voltage generation unit 113B_3 as the reference voltage VREF. For example, the selection unit 113B_13 may include a multiplexer.

Figure 9:
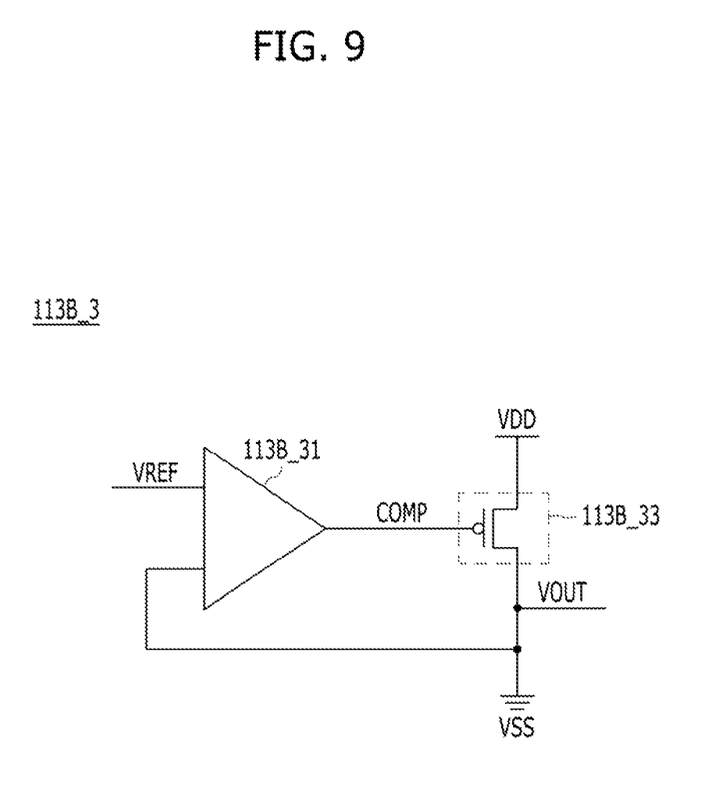
FIG. 9 is a circuit diagram illustrating a supply voltage generation unit shown in FIG. 7.

FIG. 9 is a circuit diagram illustrating the supply voltage generation unit 113B_3 shown in FIG. 7.

Referring to FIG. 9, the supply voltage generation unit 113B_3 may include a second comparison unit 113B_31 and a driving unit 113B_33.

The second comparison unit 113B_31 may compare the supply voltage VOUT with the reference voltage VREF and generate a comparison signal COMP corresponding to the comparison result. For example, the second comparison unit 113B_31 may disable the comparison signal COMP when the supply voltage VOUT is lower than the reference voltage VREF as the comparison result of the supply voltage VOUT and the reference voltage VREF. In contrast, the second comparison unit 113B_31 may enable the comparison signal COMP when the supply voltage VOUT is higher than the reference voltage VREF as the comparison result of the supply voltage VOUT and the reference voltage VREF.

The driving unit 113B_33 may drive the supply voltage VOUT terminal with the source voltage VDD in response to the comparison signal COMP. For example, the driving unit 113B_33 may drive the supply voltage VOUT terminal to generate the supply voltage VOUT corresponding to the source voltage VDD during the start-up section and corresponding to the reduced voltage VDD-α during the normal section, based on the reference voltage VREF.

Hereinafter, an operation of the image sensing device 100 having the aforementioned structure in accordance with the embodiment of the present invention is described.

First, an operation of the voltage generator 110 is described below with reference to FIG. 10.

Figure 10:
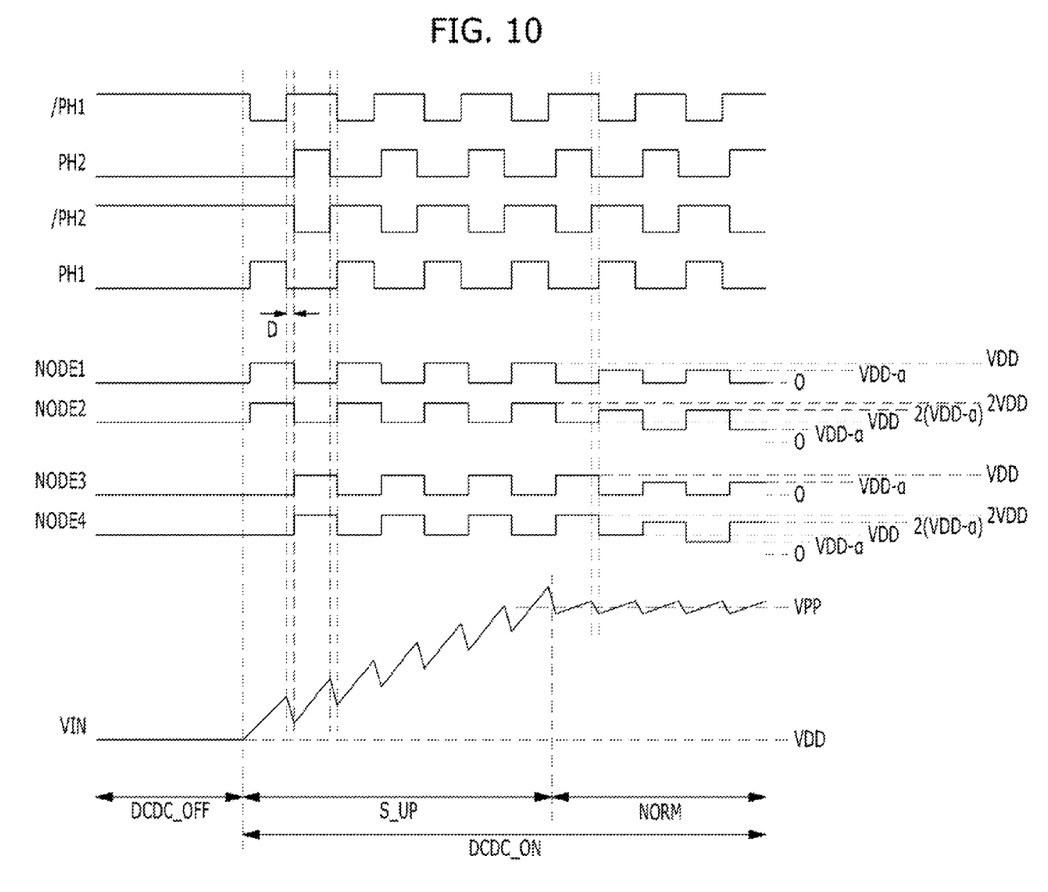
FIG. 10 is a timing diagram for describing an operation of the voltage generator shown in FIG. 3.

FIG. 10 is a timing diagram for describing the operation of the voltage generator 110 shown in FIG. 3.

Referring to FIG. 10, the voltage generator 110 is disabled and does not generate the internal voltage VIN in a waiting section DCDC_OFF and is enabled and generates the internal voltage VIN in a generation section DCDC_ON.

An operation of the voltage generator 110 in the waiting section DCDC_OFF is described below.

The supply voltage conversion block 111 may be disabled in response to the first differential clocks PH1 and /PH1 and the second differential clocks PH2 and /PH2 having fixed voltage levels during the waiting section DCDC_OFF. For example, the supply voltage conversion block 111 may wait without performing a boosting operation for generating the internal voltage VIN in response to the first primary clock PH1 having a fixed logic low voltage level, the first secondary clock /PH1 having a fixed logic high voltage level, the second primary clock PH2 having a fixed logic low voltage level and the second secondary clock /PH2 having a fixed logic high voltage level during the waiting section DCDC_OFF.

The precharge unit (not shown in the drawing) may precharge the internal voltage VIN terminal with the source voltage VOD.

Next, an operation of the voltage generator 110 in the generation section DCDC_ON is described below.

The generation section DCDC_ON may include a start-up section S_UP and a normal section NORM. The start-up section S_UP may include an initial generation section where the internal voltage VIN is developed from an initial setting level, e.g., VDD to a target level, e.g., VPP. The normal section NORM may include a stabilization section after the internal voltage VIN reaches the target level.

The first differential clocks PH1 and /PH1 and the second differential clocks PH2 and /PH2 may toggle opposite to each other and be enabled at a predetermined time interval D during the generation section DCDC_ON. For example, the first primary clock PH1 and the second primary clock PH2 may be alternately enabled, and the time interval D may exist between the active sections of the first and second primary clocks PH1 and PH2 to a logic high level. The first secondary clock /PH1 and the second secondary clock /PH2 may be alternately enabled, and the time interval D may exist between the active sections of the first and second secondary clocks /PH1 and /PH2 to a logic low level. This is for reducing leakage current occurring in the supply voltage conversion block 111. For example, when the first secondary clock /PH1 and the second primary clock PH2 are simultaneously enabled, a direct current path may be formed through the first PMOS transistor MP1 and the first NMOS transistor MN1, and consequently leakage of current may occur from the supply voltage VOUT terminal to the ground voltage VSS terminal. When the second secondary clock /PH2 and the first primary clock. PH1 are simultaneously enabled, a direct current path may be formed through the second PMOS transistor MP2 and the second NMOS transistor MN2 and consequently current leakage may occur from the supply voltage VOUT terminal to the ground voltage VSS terminal. Therefore, when the first differential clocks PH1 and /PH1 and the second differential clocks PH2 and /PH2 are generated at the time interval D, current leakage does not occur.

The voltage generator 110 may be enabled and perform the boosting operation during the generation section DCD-C_ON in response to the first differential clocks PH1 and /PH1 and second differential clocks PH2 and /PH2 toggling.

For example, the supply voltage control block 113 may generate the supply voltage VOUT corresponding to the source voltage VDD during the start-up section S_UP, because the internal voltage VIN does not reach the target level VPP as a result of detecting a voltage level of the internal voltage VIN. The supply voltage conversion block 111 may generate the internal voltage VIN during the start-up section S_UP in response to the first differential clocks PH1, and /PH1 and the second differential clocks PH2 and /PH2. The supply voltage conversion block 111 may generate the internal voltage VIN based on the supply voltage VOUT corresponding to the source voltage VDD. To be specific when the first PMOS transistor MP1 and the second PMOS transistor MP2 are alternately turned on in response to the first secondary clock /PH1 and the second secondary clock /PH2, the charge corresponding to the source voltage VDD may be alternately accumulated in the first boosting capacitor C1 and the second boosting capacitor C2. The accumulated charge may be alternately transmitted to the internal voltage VIN terminal. A ripple may occur in the internal voltage VIN due to the accumulated charge. To sum up, since the supply voltage conversion block 111 uses the supply voltage VOUT corresponding to the source voltage VDD during the start-up section S_UP, severely large ripple may occur in the internal voltage VIN but the internal voltage VIN may quickly reach the target level VPP.

The supply voltage control block 113 may generate the supply voltage VOUT corresponding to the reduced voltage VDD-α during the normal section NORM since the internal voltage VIN reaches the target level VPP as a result of detecting a voltage level of the internal voltage VIN. The supply voltage conversion block 111 may maintain the internal voltage VIN at the target level VPP during the normal section NORM in response to the first differential clocks PH1 and /PH1 and the second differential clocks PH2 and /PH2. The supply voltage conversion block 111 may use the supply voltage VOUT corresponding to the reduced voltage VDD-α. To be specific, when the first PMOS transistor MP1 and the second PMOS transistor MP2 are alternately turned on in response to the first secondary clock /PH1 and the second secondary clock /PH2, the charge corresponding to the reduced voltage VDD-α may be alternately accumulated in the first boosting capacitor C1 and the second boosting capacitor C2. The accumulated charge may be alternately transmitted to the internal voltage VIN terminal. A ripple may occur in the internal voltage VIN due to the accumulated charge. To sum up, since the supply voltage conversion block 111 uses the supply voltage VOUT corresponding to the reduced voltage VDD-α during the normal section NORM, the ripple occurring in the internal voltage VIN may decrease.

As described above, while the internal voltage VIN stabilizes at the target level VPP, the row controller 120 may generate the operation control signals CTRLS based on the internal voltage VIN and the source voltage VDD. For example, the row controller 120 may generate the transmission signal TX based on the internal voltage VIN, and it may generate the reset signal RX and the selection signal SX based on the source voltage VDD.

The pixel array 130 may generate the pixel signals VPX<0:X> in response to the operation control signals CTRLS, and the analog-to-digital converter 140 may generate the digital signals DOUT<0:X> corresponding to the pixel signals VPX<0:X>.

In accordance with the embodiments of the present invention, a start-up section for generating an internal voltage may be reduced as a source voltage is used for a supply voltage, and a ripple occurring in the internal voltage may be also reduced as a reduced voltage is used for the supply voltage during a normal section following the start-up section. Furthermore, the operational reliability of an image sensing device may be improved as an internal voltage is produced with a reduced amount of rippling.

In accordance with the embodiments of the present invention, time until an internal voltage reaches a target level may be shortened as an initial generation section decreases when the internal voltage is generated. Also, when the internal voltage reaches the target level, the internal voltage may be stably generated as rippling in the internal voltage decreases.

While the present invention has been described with respect to specific embodiments, the embodiments are not intended to be restrictive, but rather descriptive. Further, it is noted that the present invention may be achieved in various ways through substitution, change, and modification, by those skilled in the art without departing from the scope of the present invention as defined by the following claims.

For example, although it is described in the embodiments of the present invention that a voltage generator is applied to an image sensing device, all devices or circuits using an internal voltage are applicable.

What is claimed is:

1. A voltage generator, comprising:
   a supply voltage conversion part suitable for generating a boosted voltage by boosting a supply voltage based on first and second clocks;
   a voltage detection part suitable for detecting a voltage level of the boosted voltage; and
   a voltage supply part suitable for supplying the supply voltage to the supply voltage conversion part in response to a detection signal outputted from the voltage detection part, wherein the supply voltage has a first voltage level during a start-up section where the boosted voltage is developed to a target level and has a second voltage level lower than the first voltage level during a normal section after the boosted voltage reaches the target level.

2. The voltage generator of claim 1, wherein the voltage detection part includes:
   a division block suitable for dividing the boosted voltage at a predetermined division ratio and generating a divided voltage; and
   a first comparison block suitable for comparing the divided voltage with a target voltage and generating the detection signal.

3. The voltage generator of claim 1, wherein the voltage supply part includes:
a reference voltage generation block suitable for generating one among a power supply voltage and a reduced voltage having a voltage level lower than that of the power supply voltage as a reference voltage in response to the detection signal; and
a supply voltage generation block suitable for generating the supply voltage based on the reference voltage.

4. The voltage generator of claim 3, wherein the reference voltage generation block includes:
a reduction unit suitable for reducing the power supply voltage and generating the reduced voltage; and
a selection unit suitable for outputting the power supply voltage or the reduced voltage as the reference voltage in response to the detection signal.

5. The voltage generator of claim 3, wherein the supply voltage generation block includes:
a second comparison unit suitable for comparing the reference voltage with the supply voltage; and
a driving unit suitable for driving an output terminal of the supply voltage with the power supply voltage in response to a comparison signal outputted from the second comparison unit.

6. An image sensing device, comprising:
a pixel suitable for generating an image signal in response to a plurality of operation control signals;
an operation controller suitable for generating one or more of the operation control signals based on an internal voltage; and
a voltage generator suitable for generating the internal voltage based on a supply voltage having different voltage levels that correspond to generation sections of the internal voltage,
wherein the voltage generator includes:
a supply voltage conversion part suitable for converting the supply voltage into the internal voltage; and
a supply voltage control part suitable for supplying the supply voltage to the supply voltage conversion part, wherein the supply voltage has different voltage levels that correspond to the generation sections of the internal voltage,
wherein the supply voltage conversion part boosts the supply voltage based on first and second clocks and generates a boosted voltage as the internal voltage,
wherein the supply voltage control part includes:
a voltage detection block suitable for detecting a voltage level of the boosted voltage; and
a voltage supply block suitable for supplying the supply voltage to the supply voltage conversion part in response to a detection signal outputted form the voltage detection block, wherein the supply voltage has a first voltage level during a start-up section where the boosted voltage is developed to a target level and has a second voltage level lower than the first voltage level during a normal section after the boosted voltage reaches the target level.

7. The image sensing device of claim 6, wherein the pixel includes:
a transistor suitable for electrically coupling a photodiode to a floating diffusion node in response to a first operation control signal,
wherein the operation controller generates the first operation control signal based on the internal voltage.

8. The image sensing device of claim 6, wherein the generation sections of the internal voltage include:
a start-up section where the internal voltage is developed to a target level: and
a normal section after the internal voltage reaches the target level.

9. The image sensing device of claim 8, wherein the voltage generator generates the internal voltage based on the supply voltage having a first voltage level during the start-up section and having a second voltage level lower than the first voltage level during the normal section.

10. The image sensing device of claim 6, wherein the voltage detection block includes:
a division unit suitable for dividing the boosted voltage at a predetermined division ratio and generating a divided voltage; and
a first comparison unit suitable for comparing the divided voltage with a target voltage and generating the detection signal.

11. The image sensing device of claim 6, wherein the voltage supply block includes:
a reference voltage generation block suitable for generating a power supply voltage or a reduced voltage having a voltage level lower than the power supply voltage as a reference voltage in response to the detection signal; and
a supply voltage generation block suitable for generating the supply voltage based on the reference voltage.

12. The image sensing device of claim 11, wherein the reference voltage generation block includes:
a reduction unit suitable for reducing the power supply voltage and generating the reduced voltage; and
a selection unit suitable for outputting the power supply voltage or the reduced voltage as the reference voltage in response to the detection signal.

13. The image sensing device of claim 11, wherein the supply voltage generation block includes:
a second comparison unit suitable for comparing the reference voltage with the supply voltage; and
a driving unit suitable for driving an output terminal of the supply voltage with the power supply voltage in response to a comparison signal outputted from the second comparison unit.

* * * * *